Figure 3:
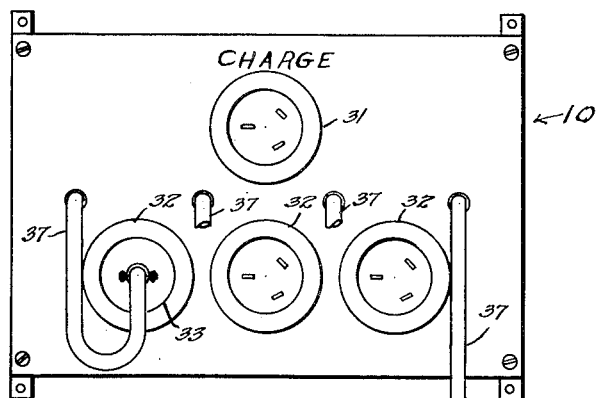

March 13, 1934.  A. L. YOUNG  1,950,428
STORAGE BATTERY CHARGING AND DISTRIBUTING PANEL
Filed Nov. 18, 1932   2 Sheets-Sheet 1
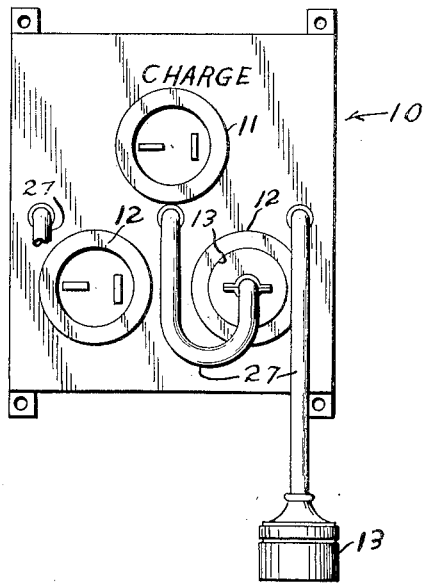
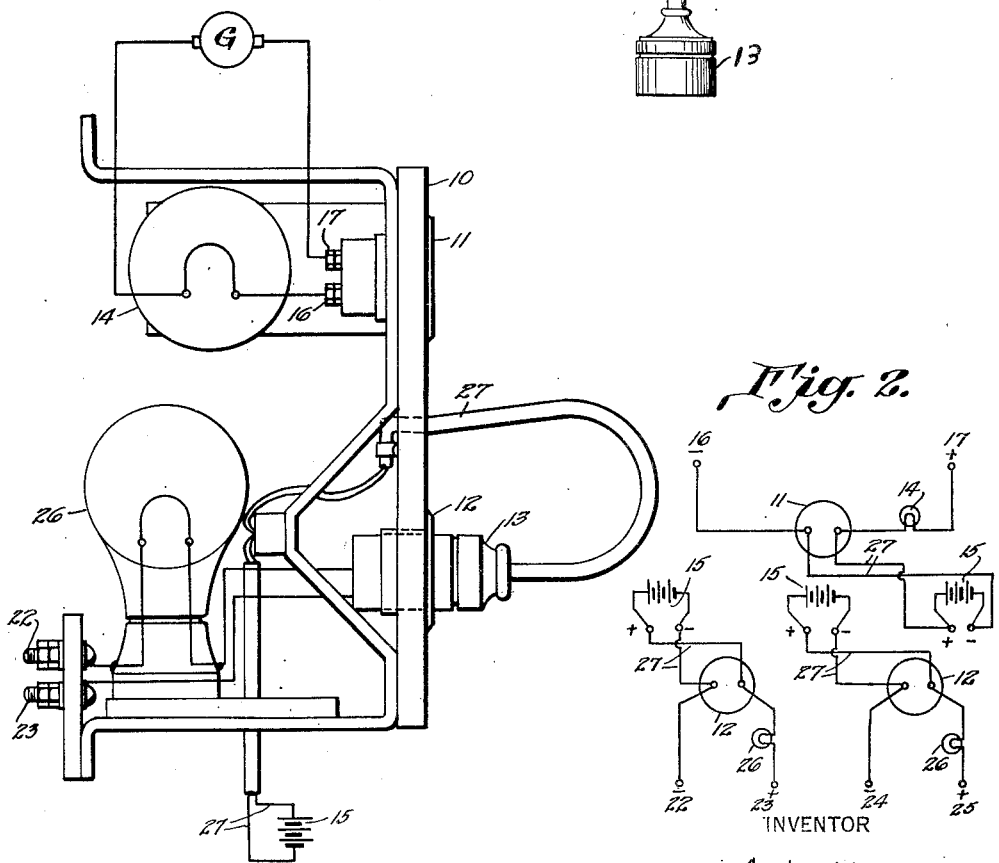
INVENTOR
BY A. L. Young
ATTORNEY Patented Mar. 13, 1934

1,950,428

UNITED STATES PATENT OFFICE 1,950,428

STORAGE BATTERY CHARGING AND DISTRIBUTING PANEL

Albert L. Young, Clarendon, Va.

Application November 18, 1932, Serial No. 643,190

5 Claims. (Cl. 171—314)

(Granted under the act of March 3, 1883, as amended April 30, 1928; 370 O. G. 757)

This invention relates to panels for the charging and discharging of storage batteries.

An object of my invention is to provide a novel and fool-proof means for charging and discharging storage batteries.

Another object of my invention is to provide a ready means for the distribution of electric energy to storage batteries for charging the same and to radio receivers for energizing the circuits thereof.

A further object of my invention is to supply a panel for the distribution of electric energy to electrical devices whose operations demand a source of electrical energy of constant medium voltages and currents, which is best provided by storage batteries.

In previous systems of storage battery charging and discharging known to the prior art, whenever any intermediate distribution panel has been used it has usually been an intricate and complicated aggregation of switches or other exteriorly contacting devices. As will be shown, the panel hereinafter disclosed and described increases considerably the facility and positiveness with which storage batteries may be charged and discharged. Thus all the inherent disadvantages of the usual switchboard are obviated.

Figure 4:
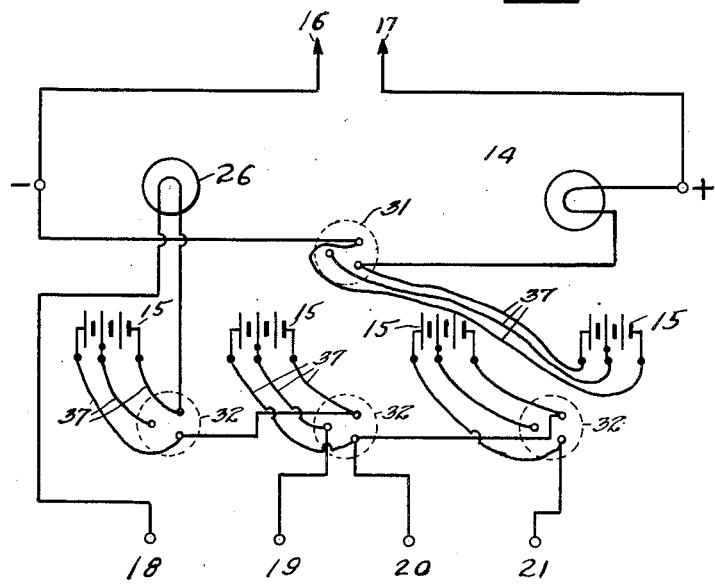

Referring to the drawings:

Figs. 1 and 3 show front views of two embodiments of my invention;

Figs. 2 and 4, respectively, illustrate the wiring diagrams of the connections afforded by the embodiments shown in Figs. 1 and 3.

Fig. 5 is a side view of the embodiment of my invention as shown in Fig. 1.

Referring to the different figures of the drawings, in all of which like parts are designated by like reference characters, Figs. 1 and 2 illustrate one form of my invention and its wiring diagram which comprises one charging circuit and two separate battery discharging circuits. The base 10 is of some insulating material, preferably of those known to the prior art as bakelite or formica. Polarity indicating receptacle 11 is wired to back panel terminals 16 and 17 to which is connected the source of direct current electrical energy used for charging. The said source should be of suitable voltage to charge the batteries used. In the present case for charging 48 volt radio "B" storage batteries, this source is any 120 volt D. C. supply and a 75 watt lamp 14 is used as a charging resistor. Polarity indicating receptacles 12 are wired to back panel terminals 22 and 23, 24 and 25, respectively, to which are connected the separate devices which are to be operated by storage battery current. The three polarity indicating two-contact plugs 13 are connected to the three batteries 15 by short two-conductor patch cables 27. One end of the cable 27 is attached to the two contacts on plug 13, while the other end is connected to the two poles of the battery.

Fig. 5 is a side view of the structure as shown in Fig. 1. Herein is shown the manner of connecting a generator G with charging receptacle 11; of connecting battery 15 with plug 13 by means of the cable 27; and of connecting polarity indicating discharge circuit receptacle 12 with back panel terminals 22 and 23. Charging resistor lamp 14 and current limiting lamp 26 are also shown in their respective positions relative to the circuits in which they are employed.

The above arrangements provide for any two batteries being on discharge and one on charge, as desired. Any battery may be easily, quickly and positively connected to either discharge circuit or placed on charge at will by means of the polarity indicating plugs and receptacles. In case it is desired to limit the possible current supplied to the devices operated thereby, low wattage lamps 26 may be employed. It is understood that this arrangement may be extended so that any number of batteries, charging and single battery discharging circuits may be utilized.

Figs. 3 and 4 illustrate another form of my invention and its diagram which comprises one charging circuit and a discharging circuit for three batteries in series so as to give three different values of potential. There are four polarity indicating receptacles on the panel 10. Receptacle 31 is wired to the charging circuit as before. Receptacles 32 are wired in series between terminals 18 and 21 with taps to terminals 19 and 20, thus giving the three values of potential at terminals 19, 20 and 21. To each of the four batteries 15 utilized in this arrangement, a polarity indicating three-contact plug 33 is connected by a short three-conductor patch cable 37. One end of the cable 37 is attached to the three contacts on plug 33, while the other end is connected to the two poles and an intermediate tap on the battery. When any battery on discharge requires charging, the plug attached to that battery is removed from its receptacle 32 and placed in receptacle 31. The plug attached to the fourth battery is then placed in the receptacle 32 from which the first plug was removed. Being polarity indicating and similarly connected, any plug can be inserted in any receptacle without damage to equipment. In case it is desired to limit the current supplied, a low wattage lamp 26 may be inserted in series with the batteries as shown. This arrangement may be used for any number of batteries by increasing the size of the panel and the number of receptacles thereon.

While I have described certain embodiments of my invention, I desire that it be understood that modifications may be made and that no limitations upon my invention are intended other than are imposed by the scope of the appended claims.

The invention described herein may be manufactured and used by or for the Government of the United States of America for governmental purposes without the payment of any royalty thereon.

What I claim is:

1. In a system of storage battery charging and discharging, a panel containing a plurality of polarity indicating receptacles one of said receptacles being connected to a charging circuit and the remainder connected to discharging circuits, and polarity indicating plugs attached by cables to the storage batteries said plugs being adapted for insertion into said receptacles.

2. In a system of storage battery charging and discharging, a panel containing a polarity indicating receptacle connected to a source of electric energy for charging storage batteries, a plurality of similar polarity indicating receptacles each of which is wired so as to facilitate connection to a single discharge circuit, and means whereby the storage batteries may be properly connected to the charging circuit or to any discharge circuit.

3. In a system of storage battery charging and discharging, a panel containing a polarity indicating receptacle adapted to be connected to a source of suitable electric energy for charging batteries, polarity indicating plugs individually attached to separate storage batteries, and polarity indicating receptacles adapted to receive said plugs and so wired as to connect said batteries in series with respect to the discharge circuit thus furnishing a plurality of potentials to said discharge circuit.

4. In a system of storage battery charging and discharging, a panel composed of insulating material, a charging receptacle contained in said panel comprising two electrical conductors arranged so as to constitute two rectangular apertures in said receptacle, the transverse major axes of said apertures being at right angles to each other, said apertures being connected by two electrical conductors to the positive and negative poles of the source of electrical energy used for charging, other receptacles contained in said panel whose similar conductors and apertures are connected to separate discharge circuits, and plugs connected to similar storage batteries by separate cables, each plug supporting two rectangular metallic contacts whose transverse major axes are at right angles to each other so as to fit uniquely in any one of said receptacles whereby any battery may be properly connected to the charging source or to either discharge circuit.

5. In a system of storage battery charging and discharging, a panel composed of insulating material, a charging receptacle contained in said panel comprising three electrical conductors arranged so as to constitute three rectangular apertures in said receptacle, the transverse major axes extended of two of said apertures being symmetrically disposed with respect to the transverse major axis extended of the third aperture, said first two apertures being connected to the positive and negative poles of the source of electrical energy used for charging, the third reference aperture being unconnected in said charging receptacle, three other receptacles contained in said panel whose similar apertures and conductors are connected in series to an external discharge circuit supplying various potentials to said discharge circuit from the electromotive force of a single battery to the combined electromotive force of any three batteries, and four plugs connected to four similar storage batteries by separate cables, each cable containing three conductors connected at one end to the end poles of a battery and an intermediate tap and at the other end to one of said plugs which supports three rectangular metallic contacts whose transverse major axes are so geometrically disposed as to enable each plug to fit uniquely in any one of said receptacles whereby any battery may be properly connected to the charging source while the other three are connected in series and supplying desired potentials to the external discharge circuit.

ALBERT L. YOUNG.